US008880269B2

(12) United States Patent
Ito et al.

(10) Patent No.: US 8,880,269 B2
(45) Date of Patent: Nov. 4, 2014

(54) POWER TRANSMISSION CONTROL DEVICE FOR VEHICLE

(71) Applicant: AISIN AI Co., Ltd., Nishio (JP)

(72) Inventors: Yoshiki Ito, Nukata-Gun (JP); Hiroki Inoue, Nishio (JP); Kazutaka Kobayashi, Okazaki (JP); Takeshige Miyazaki, Chiryu (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 0 days.

(21) Appl. No.: 14/219,442

(22) Filed: Mar. 19, 2014

(65) Prior Publication Data

US 2014/0206501 A1 Jul. 24, 2014

Related U.S. Application Data

(63) Continuation of application No. 13/994,920, filed as application No. PCT/JP2011/068508 on Aug. 15, 2011, now Pat. No. 8,712,622.

(30) Foreign Application Priority Data

Dec. 28, 2010 (JP) ................................. 2010-291784

(51) Int. Cl.
B60L 9/00 (2006.01)
B60W 20/00 (2006.01)

(52) U.S. Cl.
CPC ............. B60W 20/40 (2013.01); Y10S 903/902 (2013.01)
USPC ........................................... 701/22; 903/902

(58) Field of Classification Search
None
See application file for complete search history.

(56) References Cited

U.S. PATENT DOCUMENTS

| 6,334,079 | B1 | 12/2001 | Matsubara et al. |
| 7,749,132 | B2 | 7/2010 | Motosugi et al. |
| 8,712,622 | B2* | 4/2014 | Ito et al. ........................ 701/22 |
| 2002/0189397 | A1* | 12/2002 | Sakamoto et al. .............. 74/661 |
| 2007/0275823 | A1 | 11/2007 | Motosugi et al. |
| 2010/0273604 | A1 | 10/2010 | Imaseki |

FOREIGN PATENT DOCUMENTS

| JP | 09-014360 A1 | 1/1997 |
| JP | 2000-224710 A1 | 8/2000 |
| JP | 2001-054201 A1 | 2/2001 |
| JP | 2010-178624 A1 | 8/2010 |
| JP | 2010-254014 A1 | 11/2010 |
| WO | 2009/081729 A1 | 7/2009 |

OTHER PUBLICATIONS

International Search Report and Written Opinion dated Nov. 15, 2011.

* cited by examiner

Primary Examiner — Thomas Tarcza
Assistant Examiner — Adam Alharbi
(74) Attorney, Agent, or Firm — Burr & Brown, PLLC

(57) ABSTRACT

A power transmission control device is used for a hybrid vehicle including an internal combustion engine and a motor (MG) as power sources, and includes a manual transmission and a friction clutch. A torque of the motor (MG torque) is generally adjusted to the smaller one (=MG torque final reference value) of an MG torque reference value determined based on an accelerator opening and an MG torque limit value determined based on a clutch return stroke. Based on satisfaction of a predetermined condition relating to a clutch pedal operation performed by a driver, the MG torque is intentionally adjusted to a value shifted from the MG torque final reference value in place of the MG torque final reference value. As a result, a driving force which is more appropriate or better meets a driver's intention can be obtained.

3 Claims, 11 Drawing Sheets

POWER TRANSMISSION CONTROL DEVICE FOR VEHICLE

CROSS-REFERENCE TO RELATED APPLICATIONS

This application is a Continuation of U.S. application Ser. No. 13/994,920, filed Jun. 17, 2013, now allowed, which is a National Stage Application of PCT/JP2011/068508, filed Aug. 15, 2011, the entireties of which are incorporated herein by reference, and claims the benefit under 35 USC §119(a)-(d) of Japanese Patent Application No. 2010-291784, filed Dec. 28, 2010.

FIELD OF THE INVENTION

The present invention relates to a power transmission control device for a vehicle, and more particularly, to a power transmission control device, which is to be used for a vehicle including a first power source (for example, an internal combustion engine) and a second power source (for example, an electric motor) as power sources, and includes a friction clutch.

BACKGROUND OF THE INVENTION

Conventionally, a so-called hybrid vehicle including an engine and an electric motor (an electric motor and an electric power generator) as power sources is widely known (for example, see Patent Literature 1). In recent years, a vehicle (hereinafter referred to as "HV-MT vehicle"), which is a hybrid vehicle and is provided with a manual transmission and a friction clutch, has been under development. In this context, "manual transmission" is a transmission (so-called MT) without a torque converter, in which a gear position is selected based on a shift position of a shift lever operated by a driver. Moreover, the "friction clutch" is a clutch interposed between an output shaft of an internal combustion engine and an input shaft of the manual transmission, and an engaged state of the friction plate changes in accordance with an operation amount of a clutch pedal operated by the driver. Now, a torque of the output shaft of the internal combustion engine is hereinafter referred to as "internal-combustion-engine torque," and a torque of the output shaft of the electric motor is referred to as "electric-motor torque."

CITATION LIST

Patent Literature

[PTL 1] JP 2000-224710 A

SUMMARY OF THE INVENTION

On the HV-MT vehicle, a configuration of connecting the output shaft of the electric motor to any one of the output shaft of the internal combustion engine, the input shaft of the transmission, and the output shaft of the transmission may be employed. Now, a configuration in which the output shaft of the electric motor is connected to the input shaft of the transmission or the output shaft of the transmission is considered.

In this case, the electric-motor torque can be adjusted in the following manner based on, for example, an operation amount of an accelerator pedal (accelerator opening) and an operation amount of a clutch pedal. Specifically, first, a first relationship (see FIG. 2 referred to later) between the accelerator opening and a "reference value of the electric-motor torque (electric-motor torque reference value)" and a second relationship (see FIG. 3 referred to later) between the operation amount of the clutch pedal and an "upper-limit value of the electric-motor torque (electric-motor torque limit value)" are determined and stored in advance through an experiment or the like. A current electric-motor torque reference value is determined based on a current accelerator opening and the above-mentioned first relationship. A current electric-motor torque limit value is determined based on a current operation amount of the clutch pedal and the above-mentioned second relationship. A current electric-motor torque is adjusted to the smaller one of the determined current electric-motor torque reference value and the determined current electric-motor torque limit value. The smaller value is hereinafter referred to as "electric-motor torque final reference value."

In a case where an operation of the clutch pedal is related, by adjusting the electric-motor torque to the electric-motor torque final reference value in this manner, driving feeling using the electric-motor torque of the HV-MT vehicle can be made close to driving feeling using the internal-combustion-engine torque of an ordinary MT vehicle. The ordinary MT vehicle refers to a conventionally widely known vehicle including a manual transmission and a friction clutch, and mounted with only an internal combustion engine as a power source.

A case where a driver who is inexpert (inexperienced) in the operation of the clutch pedal drives the HV-MT vehicle and operates the clutch pedal for a shift operation or the like is supposed. In this case, because of an inappropriate operation of the clutch pedal, a pattern of change of the electric-motor torque limit value (hence, the electric-motor torque final reference value) determined based on the operation amount of the clutch pedal may be determined to be a pattern different from an appropriate pattern. As a result, if the electric-motor torque is continuously adjusted to the electric-motor torque final reference value, there may arise a problem in that it becomes difficult to obtain an appropriate driving force (for example, a gear shift shock becomes larger) or the like.

On the other hand, under some situations, there is also a case where a driving force better meeting a driver's intention is obtained by intentionally adjusting the electric-motor torque to a value different from the electric-motor torque final reference value rather than by continuously adjusting the electric-motor torque to the electric-motor torque final reference value. As described above, there are some cases where it is preferred to generate an appropriate driving force by intentionally adjusting the electric-motor torque to the value different from the electric-motor torque final reference value.

The present invention has been made to cope with the problem described above, and therefore has an object to provide a power transmission control device for an HV-MT vehicle, in particular, capable of generating an appropriate driving force to be transmitted to a drive wheel by intentionally adjusting an electric-motor torque to a value different from an electric-motor torque final reference value in a case where an operation of a clutch operation member is related.

A power transmission control device for a vehicle according to the present invention is used for a hybrid vehicle including a first power source and a second power source as power sources. The power transmission control device includes a transmission, a friction clutch, and control means. The first power source and the second power source may respectively be an internal combustion engine and an electric motor, an electric motor and an internal combustion engine, or both electric motors. In the following, the description is continued assuming that the first power source and the second power source are respectively the internal combustion engine and the electric motor.

The transmission may be an automatic transmission including a torque convertor, but the transmission is preferred to be a manual transmission without a torque converter, in which a gear position is selected based on a shift position of a shift operation member operated by a driver. The transmission includes an input shaft for inputting a power from an output shaft of the internal combustion engine, and an output shaft for outputting the power to a drive wheel of the vehicle. The electric motor has an output shaft connected to the input shaft or the output shaft of the transmission.

The friction clutch is interposed between the output shaft of the internal combustion engine and the input shaft of the transmission for selectively realizing any one of the fully disengaged state, the partially engaged state, and the fully engaged state, in accordance with an operation amount of the clutch operation member operated by the driver. When the clutch operation member is not operated by the driver, the friction clutch realizes the fully engaged state. An operation amount of the clutch operation member is detected by second detection means.

The control means controls a torque of the output shaft of the internal combustion engine (internal-combustion-engine torque) and a torque of the output shaft of the electric motor (electric-motor torque). In particular, the electric-motor torque is adjusted as follows. An electric-motor torque reference value is first determined based on a stored first relationship between an operation amount of the acceleration operation member and a reference of the electric-motor torque (electric-motor torque reference value), and the detected operation amount of the acceleration operation member. An electric-motor torque limit value is determined based on a stored second relationship between the operation amount of the clutch operation member and an upper limit of the electric-motor torque (electric-motor torque limit value), and the detected operation amount of the clutch operation member. The operation amount of the acceleration operation member is detected by first detection means.

Generally (when a predetermined condition relating to the operation of the clutch operation member performed by the driver is not satisfied), the electric-motor torque is adjusted to the smaller one (electric-motor torque final reference value) of the determined electric-motor torque reference value and electric-motor torque limit value. On the other hand, based on the satisfaction of the predetermined condition relating to the operation of the clutch operation member performed by the driver, the electric-motor torque is exceptionally adjusted to a "value shifted from the electric-motor torque final reference value" in place of the electric-motor torque final reference value.

With the configuration described above, in association with the operation of the clutch operation member performed by the driver, the electric-motor torque is intentionally adjusted to the value different from the electric-motor torque final reference value so that an appropriate driving force can be generated. As a result, a driving force which is more appropriate or better meets a driver's intention can be obtained. A specific method of generating an appropriate driving force by using the electric-motor torque under various situations is described later.

In general, a configuration may be configured as follows. In the second relationship, the second torque limit value is maintained to zero when the operation amount of the clutch operation member falls within a range on the fully disengaged state side with respect to a "meet start point" (the operation amount of the clutch operation member, corresponding to a timing at which the friction clutch transitions from the fully disengaged state to the partially engaged state), the second torque limit value is maintained to a maximum value when the operation amount of the clutch operation member falls within a range on the fully engaged state side with respect to a "release start point" (the operation amount of the clutch operation member, corresponding to a timing at which the friction clutch transitions from the fully engaged state to the partially engaged state), and the second torque limit value increases from zero as the operation amount of the clutch operation member moves from the "meet start point" to the "release start point" when the operation amount of the clutch operation member is between the "meet start point" and the "release start point."

DETAILED DESCRIPTION OF THE INVENTION

Figure 1:
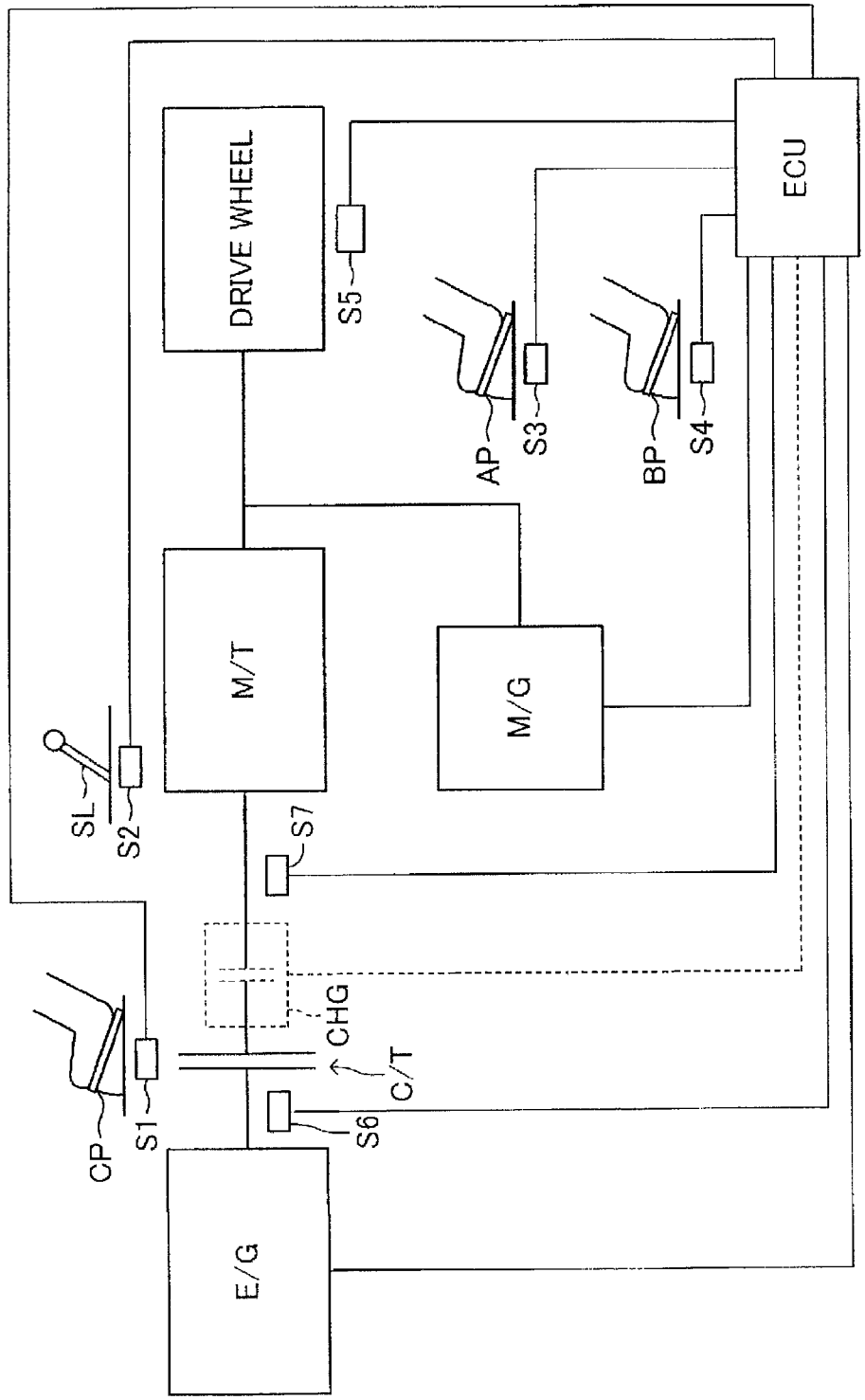
FIG. 1 A schematic configuration diagram of an HV-MT vehicle in which a power transmission control device according to an embodiment of the present invention is mounted.

A description is now given of a power transmission control device for a vehicle according to an embodiment of the present invention, referring to the drawings.

(Configuration)

FIG. 1 illustrates a schematic configuration of a vehicle in which a power transmission control device (hereinafter referred to as "this device") according to the embodiment of the present invention is mounted. This vehicle is a hybrid vehicle including an engine E/G and a motor/generator M/G as power sources, and also including a manual transmission M/T without a torque converter, and a friction clutch C/T. In other words, this vehicle is the above-mentioned HV-MT vehicle.

The engine E/G is a known internal combustion engine, and is, for example, a gasoline engine using gasoline as a fuel or a diesel engine using light oil as a fuel.

The manual transmission M/T is a transmission without a torque converter, in which a gear position is selected based on a shift position of a shift lever SL operated by a driver. The M/T includes an input shaft for inputting a power from the output shaft of the E/G, and an output shaft for outputting a power to a drive wheel of the vehicle. The M/T includes, for example, four forward gear positions (first to fourth), and one reverse gear position (R).

The gear positions of the M/T may be mechanically selected/changed by using a link mechanism or the like, which mechanically couples the shift lever SL and a sleeve (not shown) inside the M/T, based on the shift position of the shift lever SL, or may be selected/changed electrically (by means of the so-called by-wire method) by using a driving force of an actuator which operates based on a detection result by a sensor (sensor S2 described later) for detecting the shift position of the shift lever SL.

The friction clutch C/T is interposed between the output shaft of the E/G and the input shaft of the M/T. The C/T is a known clutch having an engaged state of a friction plate (more specifically, with respect to a flywheel, which integrally rotates with the output shaft of the E/G, a position in the axial direction of the friction plate, which integrally rotates with the input shaft of the M/T), which changes in accordance with an operation amount (depressed amount) of a clutch pedal CP operated by the driver.

The engaged state includes a fully engaged state, a partially engaged state, and a fully disengaged state. The fully engaged state refers to a state of transmitting the power without a slip. The partially engaged state refers to a state of transmitting the power with a slip. The fully disengaged state refers to a state of not transmitting the power. Now, from a fully depressed state of the clutch pedal CP, an operation amount in a returning direction of the clutch pedal CP is hereinafter referred to as "clutch return stroke."

The clutch return stroke is "0" in a state in which the clutch pedal CP is fully depressed, and takes the maximum value in a state in which the clutch pedal CP is released (is not operated). As the clutch return stroke increases from "0", the C/T transitions from the fully disengaged state, via the partially engaged state, to the fully engaged state.

The engaged state of the C/T (the axial position of the friction plate) may be mechanically adjusted in accordance with on the operation amount of the CP by using a link mechanism or the like for mechanically coupling the clutch pedal CP and the C/T (friction plate), or may be adjusted electrically (by means of the so-called by-wire method) by using a driving force of an actuator which operates based on a detection result by a sensor (sensor S1 described later) for detecting the operation amount of the CP.

The motor/generator M/G has one of known structures (such as AC synchronous motor), and, for example, a rotor (not shown) is configured so as to integrally rotate with the output shaft of the M/G. The output shaft of the M/G is connected so as to be able to transmit a power through an intermediation of a known gear train or the like to the output shaft of the M/T.

As indicated by a broken line in FIG. 1, a power connection/disconnection mechanism CHG for selectively realizing the "engaged state" in which the power is transmitted and the "disengaged state" in which the power is not transmitted may be interposed between the C/T and the M/T. A torque of the output shaft of the E/G is hereinafter referred to as "EG torque," whereas a torque of the output shaft of the M/G is hereinafter referred to as "MG torque." The CHG is placed in the "disengaged state" when the vehicle runs only with the MG torque (>0) in a state in which the clutch pedal CP is not operated (namely, the C/T is in the fully engaged state) and the like. In this case, by placing the CHG in the "disengaged state," the rotation of the input shaft of the M/T can be prevented from being transmitted to the output shaft of the E/G through the C/T.

This device includes the clutch operation amount sensor S1 for detecting the clutch return stroke of the clutch pedal CP, the shift position sensor S2 for detecting the position of the shift lever SL, an accelerator operation amount sensor S3 for detecting an operation amount of an accelerator pedal AP (accelerator opening), a brake operation amount sensor S4 for detecting an operation amount of a brake pedal BP (such as depressing force and presence/absence of operation), a wheel speed sensor S5 for detecting a speed of a wheel, a rotation speed sensor S6 for detecting a rotation speed Ne of the output shaft of the E/G, and a rotation speed sensor S7 for detecting a rotation speed Ni of the input shaft of the M/T.

Further, this device includes an electronic control unit ECU. The ECU controls, based on information from the above-mentioned sensors S1 to S7 and other sensors and the like, and other such information, a fuel injection amount (opening of a throttle valve) of the E/G, thereby controlling the EG torque, and controls an inverter (not shown), thereby controlling the MG torque. Further, in a case where the power connection/disconnection mechanism CHG is provided, the ECU controls the state of CHG.

Specifically, a ratio between the EG torque and the MG torque is adjusted based on the information from the above-mentioned sensors S1 to S7 and other sensors and the like, and other such information. The magnitudes of the EG torque and the MG torque are respectively adjusted mainly based on the accelerator opening. In particular, in this example, the MG torque is adjusted in the following manner.

Figure 2:
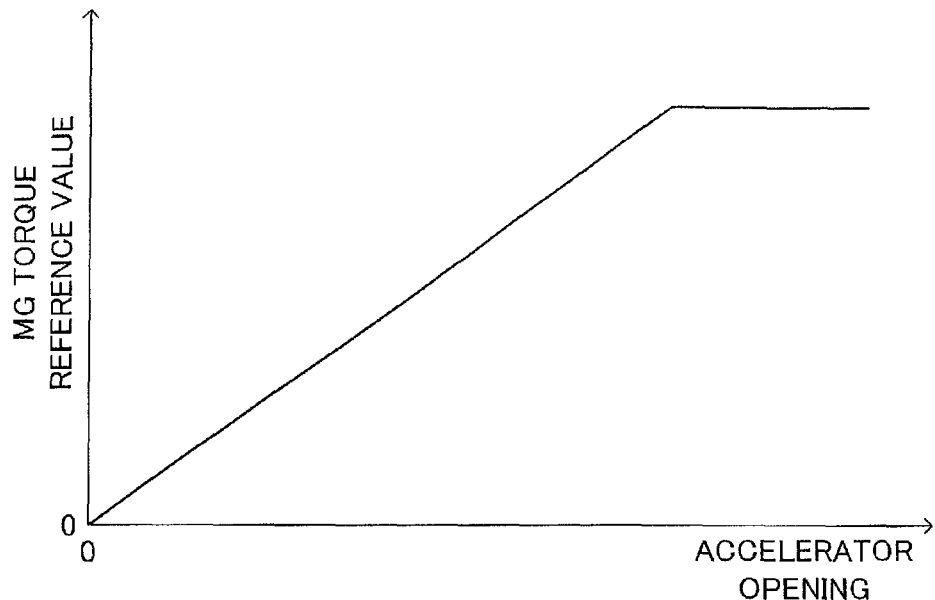
FIG. 2 A graph showing a map defining the relationship between an accelerator opening and an MG-torque reference value, which is referred to by the power transmission control device illustrated in FIG. 1.

Specifically, first, based on a map shown in FIG. 2 and a current accelerator opening, an "MG torque reference value" is determined. The MG torque reference value is determined to be a larger value as the accelerator opening increases. The characteristic of the MG torque reference value with respect to the accelerator opening can change in accordance with various states (such as a ratio between the EG torque and the MG torque) other than the accelerator opening.

Figure 3:
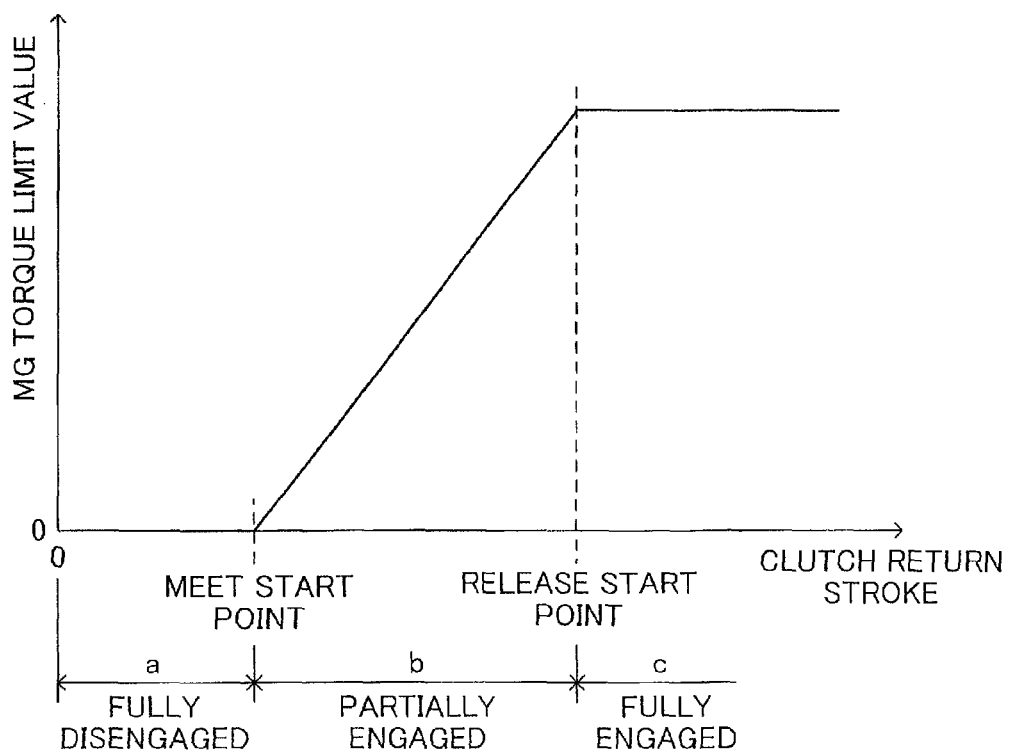
FIG. 3 A graph showing a map defining the relationship between a clutch return stroke and an MG torque limit value, which is referred to by the power transmission control device illustrated in FIG. 1.

Moreover, based on a map shown in FIG. 3 and a current clutch return stroke, an "MG torque limit value" is determined. The MG torque limit value is defined by using a meet start point and a release start point. The meet start point is a clutch return stroke corresponding to a timing at which the C/T transitions from the fully disengaged state to the partially engaged state, and the release start point is a clutch return stroke corresponding to a timing at which the C/T transitions from the fully engaged state to the partially engaged state.

In this example, in a range of the clutch return stroke from "0" to the "meet start point" (namely, a range corresponding to the fully disengaged state of the C/T; refer to "range a" of FIG. 3), the MG torque limit value maintains "0", in a range of the clutch return stroke larger than the "release start point" (namely, a range corresponding to the fully engaged state of the C/T; refer to "range c" of FIG. 3), the MG torque limit value maintains the "maximum value," and, in a range of the clutch return stroke between the "meet start point" and the "release start point" (namely, a range corresponding to the partially engaged state of the C/T; refer to "range b" of FIG. 3), as the clutch return stroke transitions from the "meet start point" to the "release start point," the MG torque limit value increases from "0." The above-mentioned "maximum value" of the MG torque limit value can be set, for example, to a value equivalent to the current "MG torque reference value" described above. The maps shown in FIGS. 2 and 3 are stored in an updatable manner in a predetermined area of a memory of the ECU.

Then, the MG torque is generally adjusted to a smaller value (hereinafter referred to as "MG torque final reference value") out of the determined "MG torque reference value" and "MG torque limit value" described above. That is, the MG torque is usually adjusted, within a range of the "MG torque limit value" determined based on the clutch return stroke, to a value based on the "MG torque reference value" (=MG torque final reference value) determined based on the accelerator opening. In this way, by adjusting the MG torque so as to coincide with the MG torque final reference value, driving feeling using the MG torque of the HV-MT vehicle can be made close to driving feeling using the EG torque of the above-mentioned "ordinary MT vehicle".

(Generation of Appropriate Driving Torque by MG Torque)

It is only when the operation of the clutch pedal is appropriate that an appropriate driving force (for example, driving force with a small gear shift shock) is obtained by adjusting the MG torque so that the MG torque coincides with the MG torque final reference value as described above. In other words, for example, when a driver who is inexpert (inexperienced) in the operation of the clutch pedal performs an inappropriate operation of the clutch pedal for a shift operation or the like, a pattern of change of the MG torque limit value (hence, the MG torque final reference value) determined based on the clutch return stroke may be determined to be a pattern different from an appropriate pattern. As a result, if the MG torque is continuously adjusted to the MG torque final reference value, there may arise a problem in that it becomes difficult to obtain an appropriate driving force (for example, the gear shift shock becomes larger) or the like.

In addition, under some situations, there is also a case where a driving force which better meets a driver's intention is obtained by intentionally adjusting the MG torque to a value different from the MG torque final reference value rather than by continuously adjusting the MG torque to the MG torque final reference value. As described above, there are some cases where it is preferred to generate an appropriate driving force by intentionally adjusting the MG torque to the value different from the MG torque final reference value.

Figure 4:
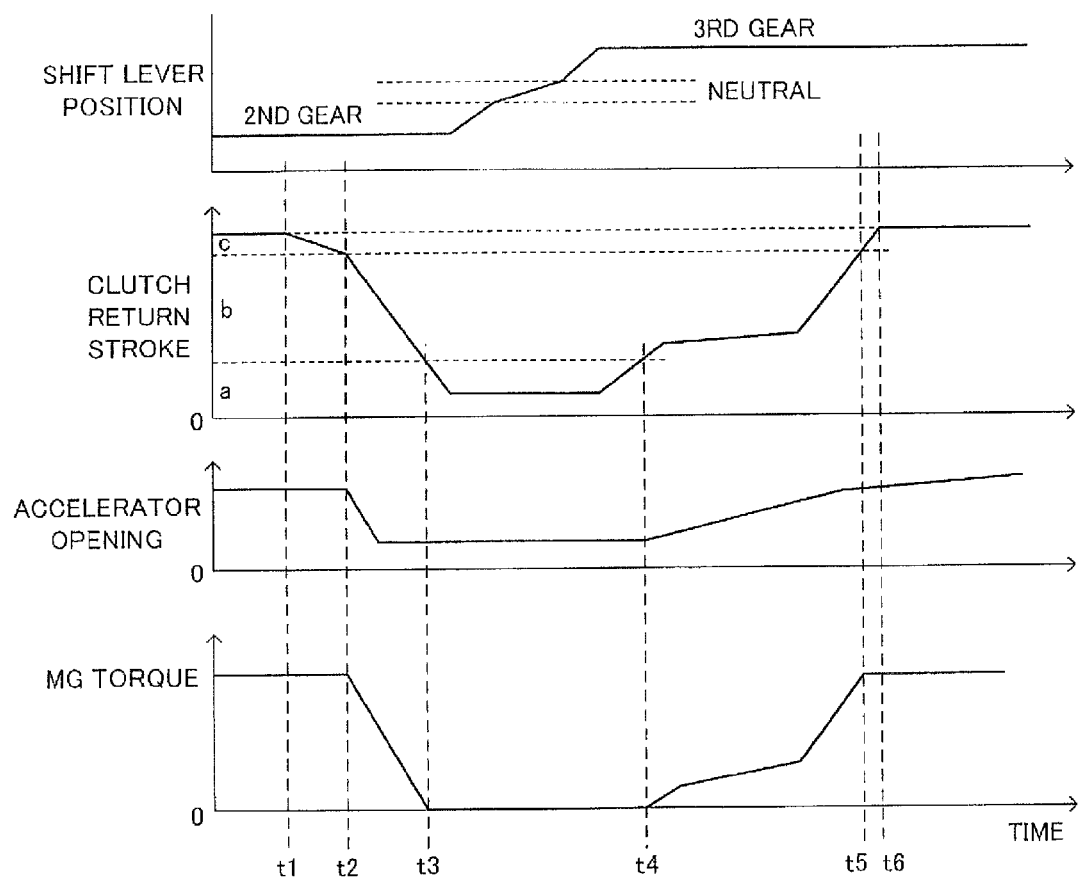
FIG. 4 A time chart illustrating an example of an operation in a case where an MG torque is continuously adjusted to an MG torque final reference value during a shift operation.

The above-mentioned case is now described referring to FIGS. 4 to 12. FIG. 4 illustrates an example of an operation in a case where the MG torque is continuously adjusted to the MG torque final reference value during the shift operation (specifically, an appropriate driving force is not generated by using the MG torque). FIGS. 5 to 12 each illustrate an example where the MG torque is intentionally adjusted to a value different from the MG torque final reference value so as to generate an appropriate driving force under the same situations as those of the example illustrated in FIG. 4. First, a description is given referring to FIG. 4.

The example illustrated in FIG. 4 assumes a case where the vehicle runs at a second speed by using only the MG torque (MG torque>0, EG torque=0) or by using both the EG torque and the MG torque (EG torque>0, MG torque>0) before a time t1. After the time t1, the accelerator pedal AP, the clutch pedal CP, and the shift lever SL are operated in cooperation with each other for a shift-up operation (shift operation) from the second speed to a third speed.

In this example, focusing on the operation of the clutch pedal CP, the clutch pedal CP is operated from the time t1 to a time t6. Specifically, at the time t1, the operation of the clutch pedal CP is started. At a time t2, the clutch return stroke transitions from the range c to the range b (the C/T transitions from the fully engaged state to the partially engaged state). At a time t3, the clutch return stroke transitions from the range b to the range a (the C/T transitions from the partially engaged state to the fully disengaged state). At a time t4, the clutch return stroke transitions from the range a to the range b (the C/T transitions from the fully disengaged state to the partially engaged state). At a time t5, the clutch return stroke transitions from the range b to the range c (the C/T transitions from the partially engaged state to the fully engaged state). At the time t6, the operation of the clutch pedal CP is terminated.

In this example, focusing on a change in the MG torque (=MG torque final reference value), before the time t2, the MG torque is adjusted to a value which is equal to the MG torque reference value based on the accelerator opening (see FIG. 2) because of the presence of the clutch return stroke in the range c. From the time t2 to the time t5, the MG torque is adjusted to a value which is equal to the MG torque limit value based on the clutch return stroke (see FIG. 3) because of the presence of the clutch return stroke in the range b or a. After the time 5, the MG torque is adjusted to the value which is equal to the MG torque reference value based on the accelerator opening (see FIG. 2) because of the presence of the clutch return stroke in the range c.

Now, referring to FIGS. 5 to 12, first to eighth cases in which the MG torque is intentionally adjusted to a value different from the MG torque final reference value so as to generate an appropriate driving force under the above-mentioned situations illustrated in FIG. 4 are described in order. In FIGS. 5 to 12, a broken line indicates a change in the case where the MG torque is continuously adjusted to the MG torque final reference value by way of comparison.

<First Case>

Figure 5:
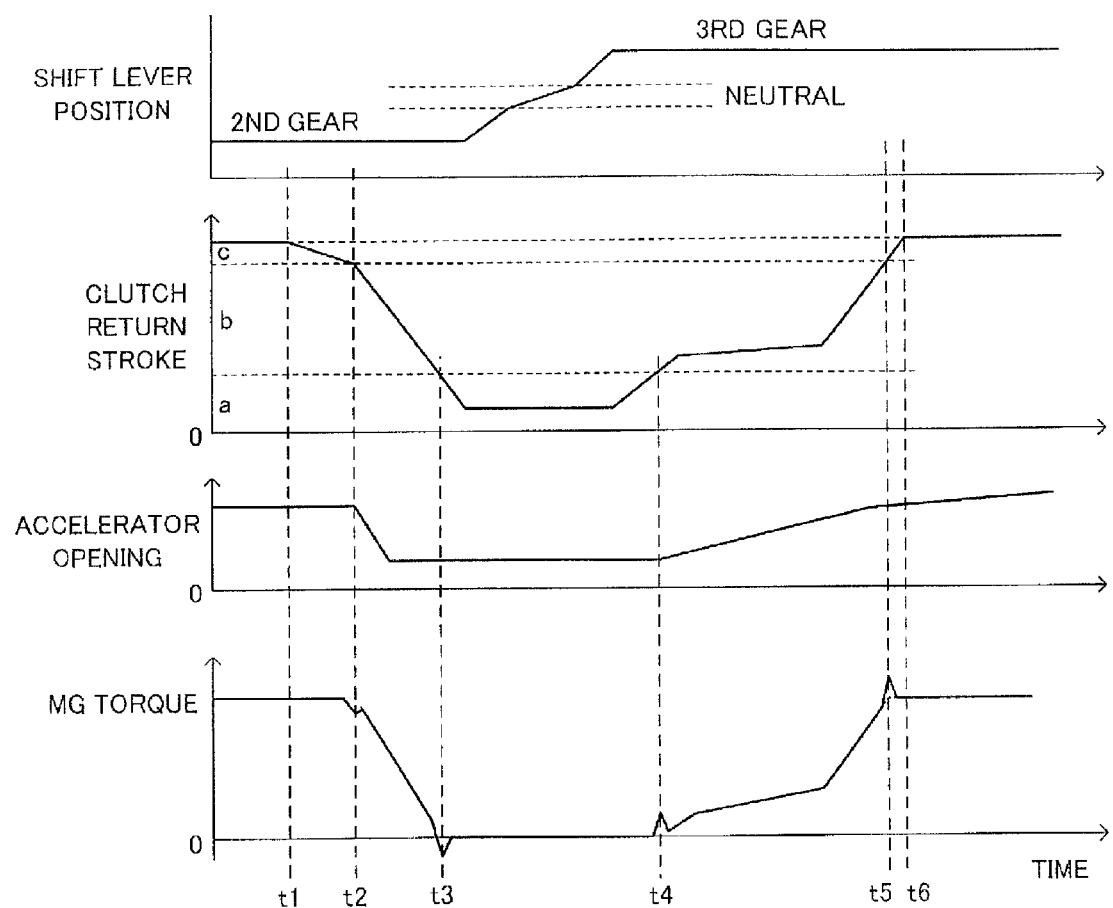
FIG. 5 A time chart illustrating an example of an operation in a first case where the MG torque is intentionally adjusted to a value different from the MG torque final reference value during the shift operation.

An example illustrated in FIG. 5 mainly assumes a case where the vehicle runs by using only the MG torque (MG torque>0, EG torque=0). In this example, for each of the timing (time t2) at which the friction clutch C/T transitions from the fully engaged state to the partially engaged state, the timing (time t3) at which the C/T transitions from the partially engaged state to the fully disengaged state, the timing (time t4) at which the C/T transitions from the fully disengaged state to the partially engaged state, and the timing (time t5) at which the C/T transitions from the partially engaged state to the fully engaged state, the MG torque is adjusted to a value shifted from the MG torque final reference value for an extremely short period including the corresponding timing. Each of the timings can be acquired, predicted, or estimated based on the result of detection of the clutch return stroke.

In this example, for each of the time t2 and the time t3 relating to a deceleration operation of the vehicle, the MG torque is adjusted to a value smaller than the MG torque final reference value for an extremely short period including the corresponding time. For each of the time t4 and the time t5 relating to an acceleration operation of the vehicle, the MG torque is adjusted to a value larger than the MG torque final reference value for an extremely short period including the corresponding time.

By intentionally adjusting the MG torque to a value different from the MG torque final reference value as in this example, an extremely small shock can be made to be perceived by the driver in synchronization with the timing at which the engaged state of the friction clutch C/T changes. As a result, in particular, the driver who is inexpert (inexperienced) in the operation of the clutch pedal can learn by an experience the clutch return stroke (position of the friction clutch C/T) corresponding to the timing at which the engaged state of the friction clutch C/T changes. Therefore, the operation of the clutch pedal by the driver described above can more rapidly improve.

Although the MG torque is adjusted to a value shifted from the MG torque final reference value in synchronization with each of the timings corresponding to the times t2 to t5 in the example illustrated in FIG. 5, the MG torque may be adjusted to a value shifted from the MG torque final reference value in synchronization with only a part of the timings corresponding to the times t2 to t5. Moreover, although the MG torque is adjusted to the value smaller than the MG torque final reference value in synchronization with each of the timings corresponding to the times t2 and t3 in the example illustrated in FIG. 5, the MG torque may be adjusted to a value larger than the MG torque final reference value in synchronization with each of the timings corresponding to the times t2 and t3. Similarly, although the MG torque is adjusted to the value larger than the MG torque final reference value in synchronization with each of the timings corresponding to the times t4 and t5, the MG torque may be adjusted to a value smaller than the MG torque final reference value in synchronization with each of the timings corresponding to the times t4 and t5.

<Second Case>

Figure 6:
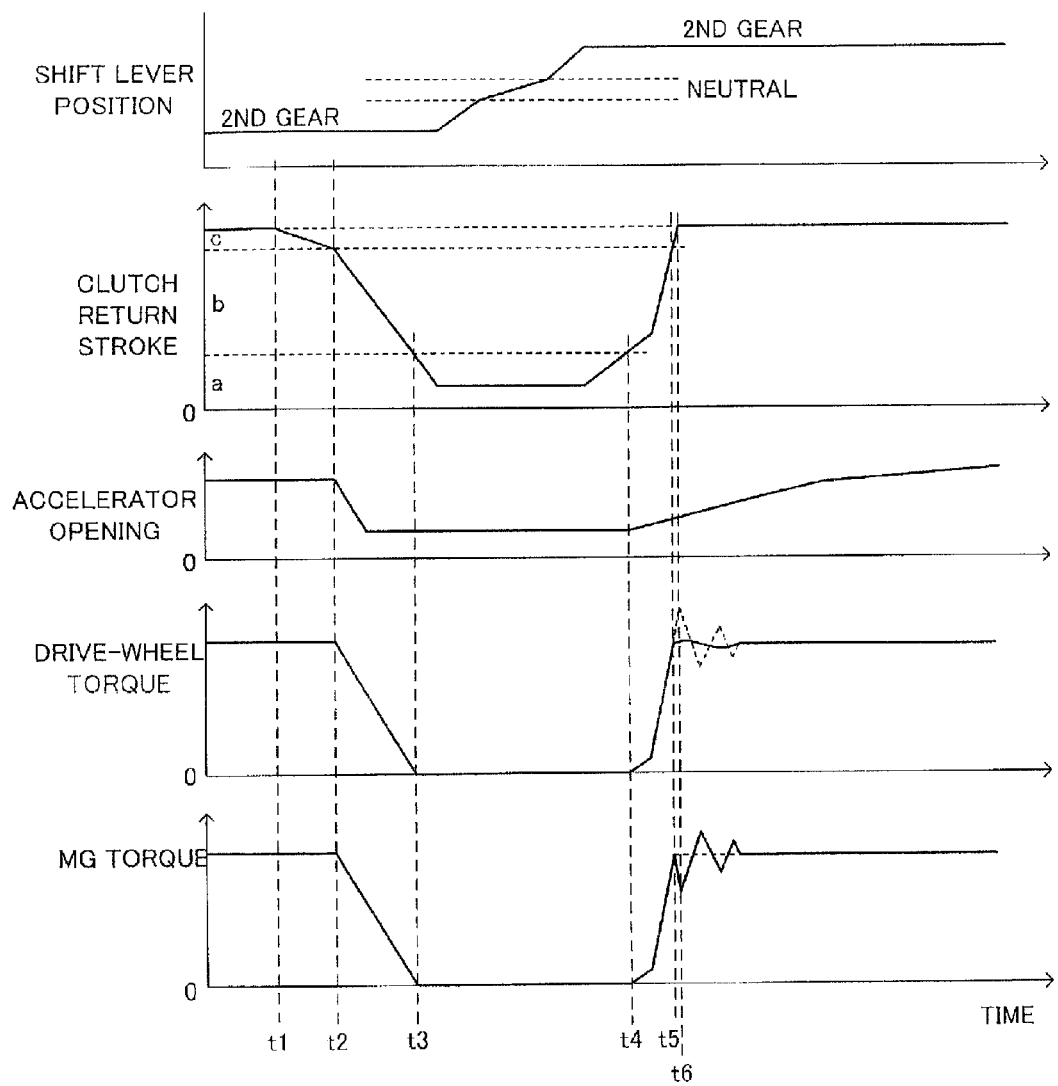
FIG. 6 A time chart illustrating an example of an operation in a second case where the MG torque is intentionally adjusted to the value different from the MG torque final reference value during the shift operation.

An example illustrated in FIG. 6 assumes a case where the vehicle runs by using both the EG torque and the MG torque (EG torque>0, MG torque>0). In this example, based on the determination that a "speed of change (gradient of change) in the clutch return stroke at the time of transition of the friction clutch C/T from the partially engaged state to the fully engaged state (immediately before the time t5) is equal to or larger than a predetermined value," the MG torque is adjusted to a value obtained by superimposing a "counter vibration pattern" on the MG torque final reference value after the friction clutch C/T transitions from the partially engaged state to the fully engaged state (after the time t5).

Here, the "counter vibration pattern" is a vibration pattern cancelling out a vibration of the driving torque (torque to be transmitted to the drive wheel of the vehicle), which is supposed to be generated after the friction clutch C/T transitions to the fully engaged state. When the speed of change in the clutch return stroke at the time of transition of the friction clutch C/T from the partially engaged state to the fully engaged state is large, vibrations are likely to be generated in a driving system (hence, in the driving torque to be transmitted to the drive wheel) immediately after the transition (see a broken line of FIG. 6). The generation of vibrations is mainly due to a "difference in rotation speed between the output shaft of the E/G and the input shaft of the M/T" immediately before the transition of the friction clutch C/T to the fully engaged state.

The vibration pattern (changes in amplitude and period with respect to time) of the driving system greatly depends on the speed of change in the clutch return stroke described above. Therefore, the "counter vibration pattern" (changes in amplitude and period with respect to time) for cancelling out the vibration pattern can also be computed based on the speed of change in the clutch return stroke described above. Specifically, for example, the "counter vibration pattern" can be computed based on a map defining the relationship between the clutch return stroke and the "counter vibration pattern," which is created in advance, and the actually acquired clutch return stroke.

By intentionally adjusting the MG torque to the value shifted from the MG torque final reference value as in this example, the vibration in the driving system (hence, the torque to be transmitted to the drive wheel), which may be generated immediately after the transition of the friction clutch C/T from the partially engaged state to the fully engaged state, can be suppressed in the case where the speed of change in the clutch return stroke at the time of transition of the C/T is high (see a solid line of FIG. 6).

<Third Case>

Figure 7:
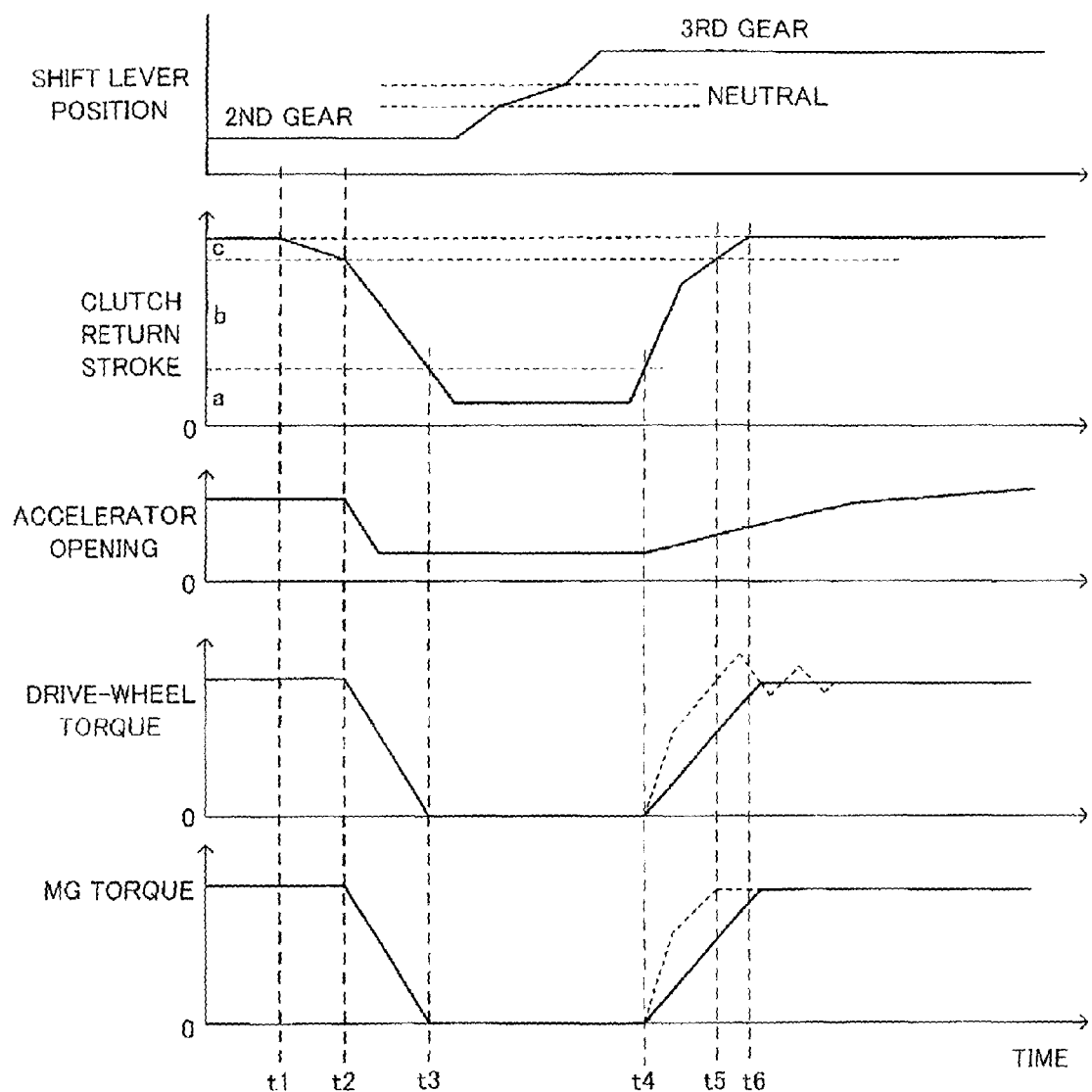
FIG. 7 A time chart illustrating an example of an operation in a third case where the MG torque is intentionally adjusted to the value different from the MG torque final reference value during the shift operation.

An example illustrated in FIG. 7 assumes a case where the vehicle runs by using both the EG torque and the MG torque (EG torque>0, MG torque>0). In this example, based on the determination that a "speed of change (gradient of change) in the clutch return stroke at the time of transition of the friction clutch C/T from the fully disengaged state to the partially engaged state (immediately before the time t4) is equal to or larger than a predetermined value," the MG torque is adjusted so that a gradient of increase of the MG torque becomes smaller than that of the MG torque final reference value after the friction clutch C/T transitions from the fully disengaged state to the partially engaged state (after the time t4).

When the speed of change in the clutch return stroke at the time of transition of the friction clutch C/T from the fully disengaged state to the partially engaged state is high, the vibration is likely to be generated in the driving system (hence, the driving torque to be transmitted to the drive wheel) after the subsequent transition to the fully engaged state, for the same reason as that described above in the second case (see a broken line of FIG. 7).

When the speed of change in the clutch return stroke at the time of transition of the friction clutch C/T from the fully disengaged state to the partially engaged state is high, a gradient of subsequent increase of the MG torque can be reduced by intentionally adjusting the MG torque to the value shifted from the MG torque final reference value as in this example. The reduction in gradient of increase can contribute to the suppression of vibrations in the driving system (hence, the torque to be transmitted to the drive wheel), which may be generated after the subsequent transition to the fully engaged state (see a solid line of FIG. 7).

<Fourth Case>

Figure 8:
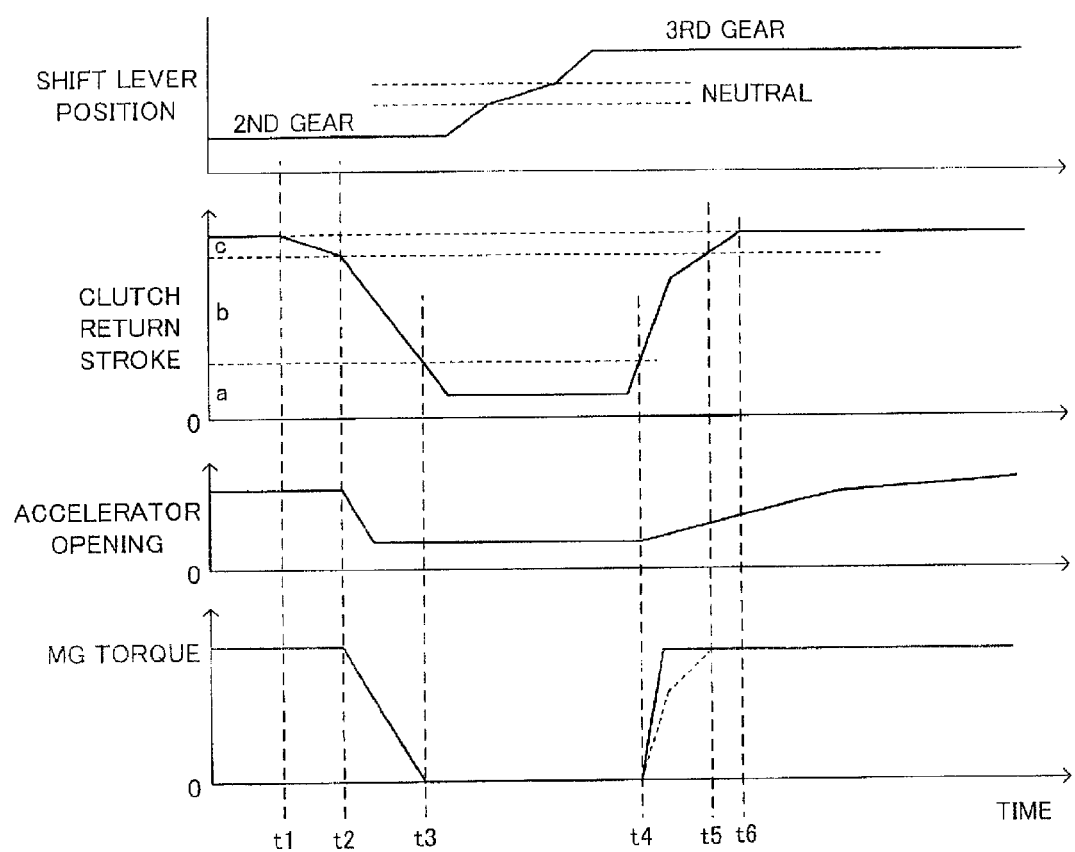
FIG. 8 A time chart illustrating an example of an operation in a fourth case where the MG torque is intentionally adjusted to the value different from the MG torque final reference value during the shift operation.

An example illustrated in FIG. 8 assumes a case where the vehicle runs by using only the MG torque (MG torque>0, EG torque=0). In this example, based on the determination that a "speed of change (gradient of change) in the clutch return stroke at the time of transition of the friction clutch C/T from the fully disengaged state to the partially engaged state (immediately before the time t4) is equal to or larger than a predetermined value," the MG torque is adjusted so that a gradient of increase of the MG torque becomes larger than that of the MG torque final reference value after the friction clutch C/T transitions from the fully disengaged state to the partially engaged state (after the time t4).

When the speed of change in the clutch return stroke at the time of transition of the friction clutch C/T from the fully disengaged state to the partially engaged state is high, it is considered that the driver desires an "immediate significant acceleration of the vehicle" in many cases.

When the speed of change in the clutch return stroke at the time of transition of the friction clutch C/T from the fully disengaged state to the partially engaged state is high, a gradient of subsequent increase of the MG torque can be increased by intentionally adjusting the MG torque to the value shifted from the MG torque final reference value as in this example. Therefore, the vehicle can be immediately significantly accelerated. As a result, the driving force which better meets the driver's intention can be obtained. When the vehicle runs by using only the MG torque as in this example, the power connection/disconnection mechanism CHG is generally maintained in the disengaged state. Therefore, even when the speed of change (gradient of change) in the clutch return stroke is large, the above-mentioned vibration in the driving system (hence, the driving torque to be transmitted to the drive wheel) is not generated.

<Fifth Case>

Figure 9:
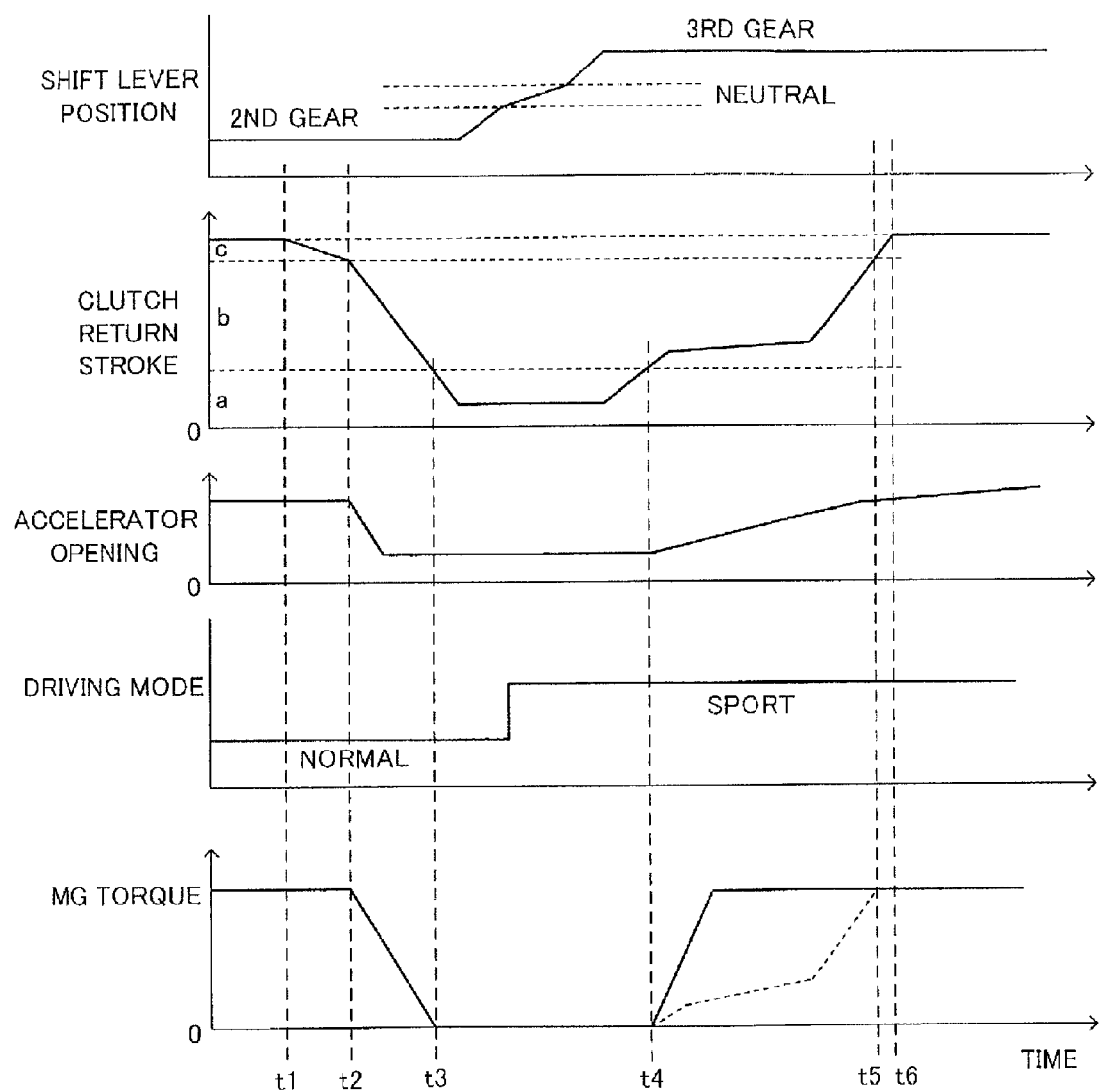
FIG. 9 A time chart illustrating an example of an operation in a fifth case where the MG torque is intentionally adjusted to the value different from the MG torque final reference value during the shift operation.

An example illustrated in FIG. 9 assumes a case where the vehicle runs by using only the MG torque (MG torque>0, EG torque=0) or by using both the EG torque and the MG torque (EG torque>0, MG torque>0). Moreover, this example assumes a vehicle having a normal mode (first mode) and a sport mode (second mode) in which the vehicle is accelerated to a higher speed than in the normal mode as driving modes, and means for switching the driving modes (selector switch or the like).

In this example, based on the determination of "selection of the sport mode as the driving mode," the MG torque is adjusted so that a gradient of increase of the MG torque becomes larger than that of the MG torque final reference value after the transition of the friction clutch C/T from the fully disengaged state to the partially engaged state (after the time t4).

When the sport mode is selected as the driving mode, it is considered that the driver desires an "immediate significant acceleration of the vehicle" in many cases. When the sport mode is selected, the gradient of increase of the MG torque after the transition of the friction clutch C/T from the fully disengaged state to the partially engaged state can be increased by intentionally adjusting the MG torque to a value shifted from the MG torque final reference value as in this example. Therefore, the vehicle can be immediately significantly accelerated. As a result, the driving force which better meets the driver's intention can be obtained.

<Sixth Case>

Figure 10:
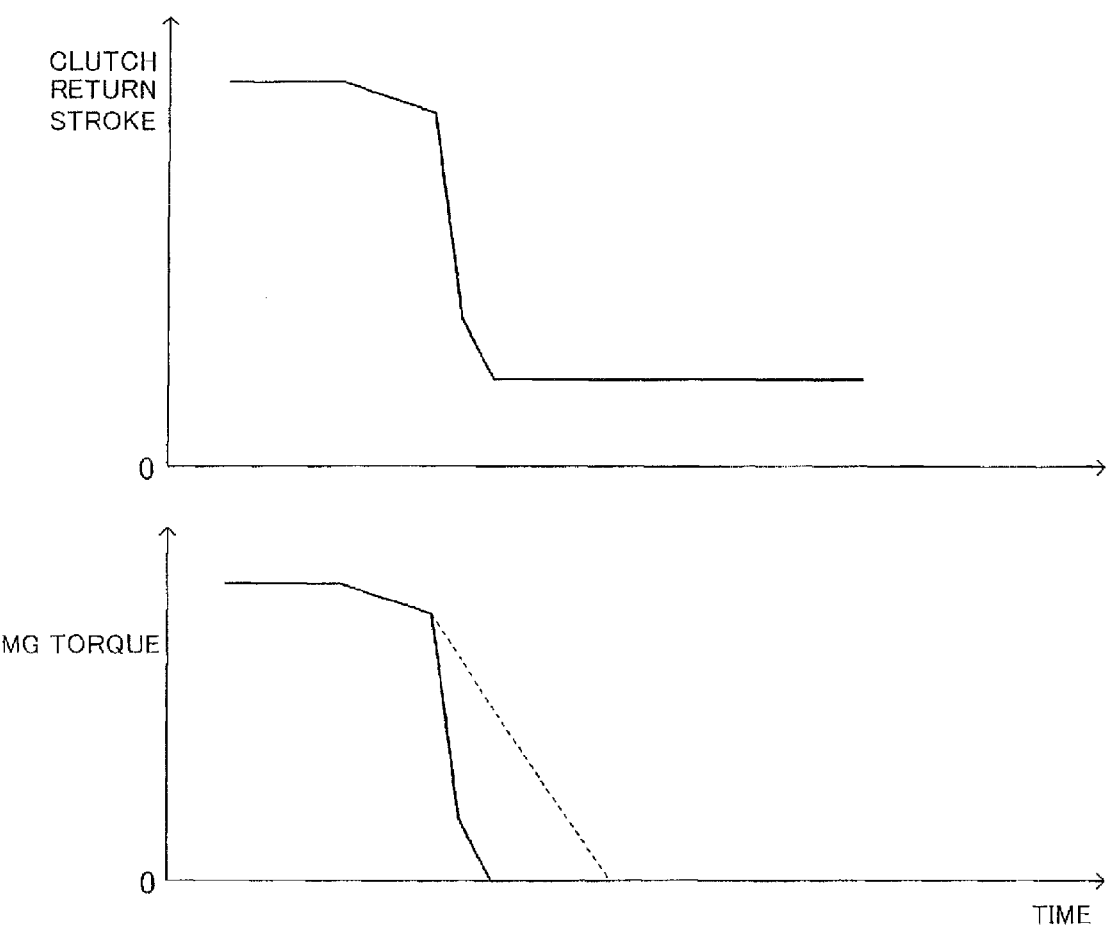
FIG. 10 A time chart illustrating an example of an operation in a sixth case where the MG torque is intentionally adjusted to the value different from the MG torque final reference value during the shift operation.

An example illustrated in FIG. 10 assumes a case where the vehicle runs by using only the MG torque (MG torque>0, EG torque=0) or by using both the EG torque and the MG torque (EG torque>0, MG torque>0). In this example, in the case where a gradient of decrease (>0) of the MG torque final reference value exceeds a predetermined value (>0) at the time of transition of the friction clutch C/T from the fully engaged state to the partially engaged state and the fully disengaged state, the MG torque is adjusted so that the gradient of decrease of the MG torque becomes equal to (is limited to) the predetermined value.

When the gradient of decrease (>0) of the MG torque final reference value is large, the gradient of decrease of the MG torque is limited by intentionally adjusting the MG torque to the value shifted from the MG torque final reference value as in this example. As a result, a shock which may be generated in the process of transition of the friction clutch C/T from the fully engaged state to the partially engaged state and the fully disengaged state can be alleviated.

<Seventh Case>

Figure 11:
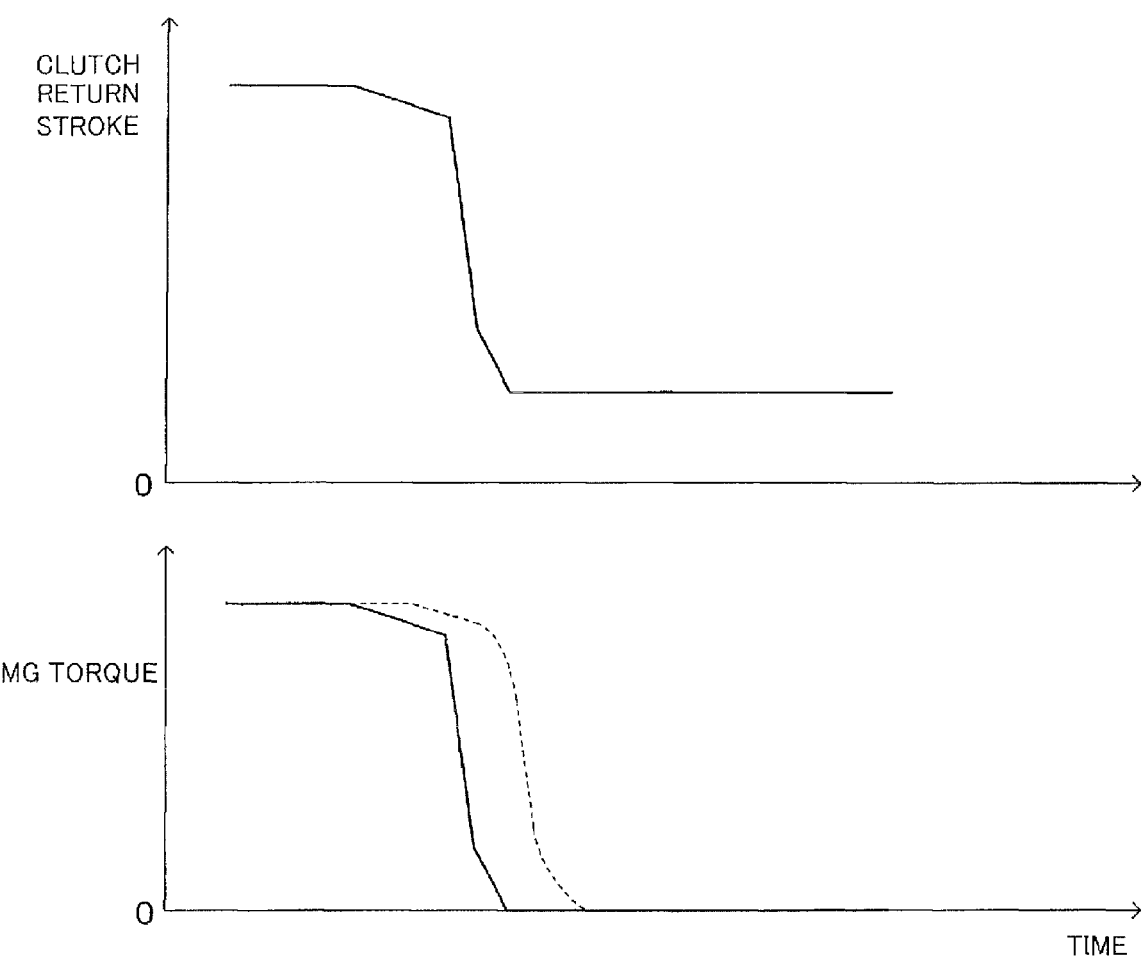
FIG. 11 A time chart illustrating an example of an operation in a seventh case where the MG torque is intentionally adjusted to the value different from the MG torque final reference value during the shift operation.

An example illustrated in FIG. 11 assumes a case where the vehicle runs by using only the MG torque (MG torque>0, EG torque=0) or by using both the EG torque and the MG torque (EG torque>0, MG torque>0). In this example, when the friction clutch C/T transitions from the fully engaged state to the partially engaged state and the fully disengaged state, the MG torque is adjusted to a "value obtained by performing delay processing on the MG torque final reference value." Here, the term "delay processing" refers to, for example, processing for providing a dead time, primary delay processing, and the like.

When the speed of change in the MG torque final reference value is high, a change in the speed of change is large, or the like, the MG torque relatively gently decreases by intentionally adjusting the MG torque to a value shifted from the MG torque final reference value as in this example. As a result, in a process of the transition of the friction clutch C/T from the fully engaged state to the partially engaged state and the fully disengaged state, feeling of gentle change can be given to the driver.

<Eighth Case>

Figure 12:
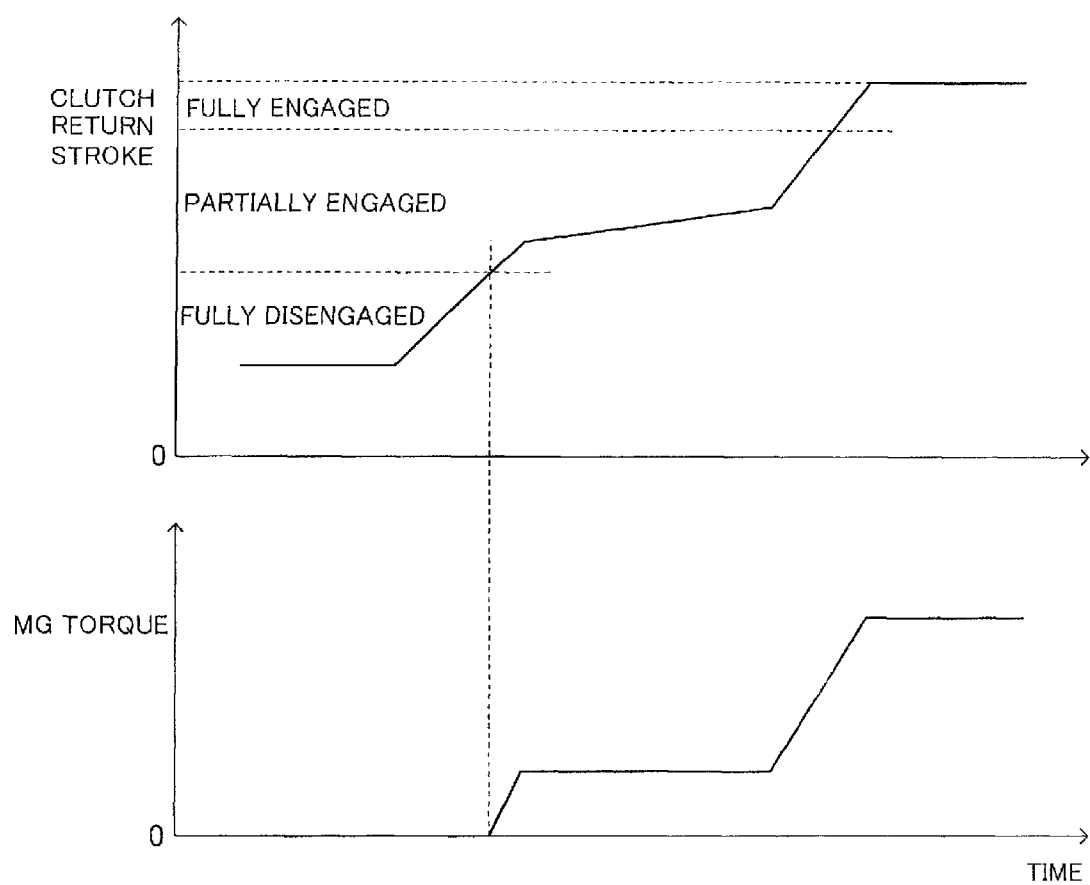
FIG. 12 A time chart illustrating an example of an operation in an eighth case where the MG torque is intentionally adjusted to the value different from the MG torque final reference value during the shift operation.

An example illustrated in FIG. 12 assumes a case where the vehicle runs by using only the EG torque (MG torque=0, EG torque>0). In this example, in a process of the transition of the friction clutch C/T from the fully engaged state through the partially engaged state, the fully disengaged state, and the partially engaged state to return to the fully engaged state, it is first determined whether the vehicle is in an accelerating direction or a decelerating direction based on the determination of "transition of the C/T from the fully disengaged state to the partially engaged state". The determination is performed based on, for example, the accelerator opening.

Then, after the transition of the C/T from the fully disengaged state to the partially engaged state, the MG torque is adjusted to a value for an orientation corresponding to the determined direction. Specifically, the MG torque is adjusted to a value for an orientation for accelerating the vehicle when the vehicle is determined to be in the acceleration direction and to a value for an orientation for decelerating the vehicle when the vehicle is determined to be in the deceleration direction.

By intentionally adjusting the MG torque to a value shifted from the MG torque final reference value as in this example, a "play" due to backlash etc. in a meshing portion between gears in the driving system can be eliminated in an early stage immediately after the transition of the C/T from the fully disengaged state to the partially engaged state.

The present invention is not limited to the embodiment described above, and various variations can be adopted within the scope of the present invention. For example, in the embodiment described above, the E/G is used as the first power source, whereas the M/G is used as the second power source. However, the M/G may be used for each of both the first power source and the second power source.

Moreover, although the output shaft of the M/G is connected to the output shaft of the M/T (through an intermediation of a known gear train or the like) so that the power can be transmitted in the embodiment described above, the output shaft of the M/G may be connected to the input shaft of the M/T (through an intermediation of a known gear train or the like) so that the power can be transmitted.

In addition, although the manual transmission M/T without a torque converter is used as the "transmission" in the embodiment described above, an automatic transmission including a torque converter may be used instead.

REFERENCE SIGNS LIST

M/T . . . transmission, E/G . . . engine, C/T . . . clutch, M/G . . . motor/generator, CP . . . clutch pedal, AP . . . accelerator pedal, S1 ... clutch operation amount sensor, S2 ... shift position sensor, S3 ... accelerator operation amount sensor, S4 ... brake operation amount sensor, S5 ... wheel speed sensor, S6 ... rotation speed sensor, S7 ... rotation speed sensor, ECU ... electronic control unit

The invention claimed is:

1. A power transmission control device for a vehicle, which is to be used for a vehicle comprising a first power source and a second power source, the power transmission control device comprising:
   a transmission including an input shaft for inputting a power from an output shaft of the first power source and an output shaft for outputting the power to a drive wheel of the vehicle, the second power source having an output shaft connected to the input shaft or the output shaft;
   a friction clutch interposed between the output shaft of the first power source and the input shaft of the transmission, for realizing a fully engaged state in which the power is transmitted without a slip when a clutch operation member to be operated by a driver is not operated and for realizing a partially engaged state in which the power is transmitted with the slip in accordance with an operation amount of the clutch operation member or a fully disengaged state in which the power is not transmitted;
   first detection means for detecting an operation amount of an acceleration operation member for accelerating the vehicle, the acceleration operation member being to be operated by the driver;
   second detection means for detecting the operation amount of the clutch operation member; and
   control means for controlling a first torque corresponding to a driving torque for the output shaft of the first power source and a second torque corresponding to a driving torque for the output shaft of the second power source,
   wherein the control means comprises:
      first determination means for determining a second torque reference value which is a reference of the second torque based on a stored first relationship between the operation amount of the acceleration operation member and the second torque reference value, and the detected operation amount of the acceleration operation member; and
      second determination means for determining a second torque limit value which defines an upper limit of the second torque based on a stored second relationship between the operation amount of the clutch operation member and the second torque limit value, and the detected operation amount of the clutch operation member, and
   wherein the control means is configured to adjust the second torque to a second torque final reference value corresponding to a smaller one of the determined second torque reference value and the determined second torque limit value,
   wherein the control means is configured to, in a case where the first torque is maintained to zero by stop of the first power source, and the vehicle runs by drive of the second power source by using only the second torque which is generated by the second power source, when the friction clutch transitions from the fully engaged state through the partially engaged state, the fully disengaged state, and the partially engaged state to return to the fully engaged state by the operation of the clutch operation member for a shift operation of the transmission, detect a timing at which the friction clutch transitions from the partially engaged state to the fully disengaged state based on the detected operation amount of the clutch operation member so as to adjust the second torque to a value shifted from the second torque final reference value in synchronization with the detected timing.

2. A power transmission control device for a vehicle according to claim 1, wherein the control means is configured to, in a case where the first torque is maintained to zero by stop of the first power source, and the vehicle runs by drive of the second power source by using only the second torque which is generated by the second power source, when the friction clutch transitions from the fully engaged state through the partially engaged state, the fully disengaged state, and the partially engaged state to return to the fully engaged state by the operation of the clutch operation member for a shift operation of the transmission, detect respective timings of a timing at which the friction clutch transitions from the fully engaged state to the partially engaged state, a timing at which the friction clutch transitions from the partially engaged state to the fully disengaged state, a timing at which the friction clutch transitions from the fully disengaged state to the partially engaged state, and a timing at which the friction clutch transitions from the partially engaged state to the fully engaged state based on the detected operation amount of the clutch operation member so as to adjust the second torque to a value shifted from the second torque final reference value in synchronization with the detected respective timings.

3. A power transmission control device for a vehicle according to claim 1, wherein the power transmission control device is configured to, in the second relationship, maintain the second torque limit value to zero when the operation amount of the clutch operation member falls within a range on the fully disengaged state side with respect to a meet start point corresponding to a timing at which the friction clutch transitions from the fully disengaged state to the partially engaged state, to maintain the second torque limit value to a maximum value when the operation amount of the clutch operation member falls within a range on the fully engaged state side with respect to a release start point corresponding to a timing at which the friction clutch transitions from the fully engaged state to the partially engaged state, and to increase the second torque limit value from zero as the operation amount of the clutch operation member moves from the meet start point to the release start point when the operation amount of the clutch operation member is between the meet start point and the release start point.

* * * * *